(12) United States Patent
Lan et al.

(10) Patent No.: US 8,002,440 B2
(45) Date of Patent: Aug. 23, 2011

(54) LED LAMP WITH REMOTE CONTROL DEVICE

(75) Inventors: Hai Lan, Taipei Hsien (TW); Shun-Yuan Jan, Taipei Hsien (TW); Chung-Yuan Huang, Santa Clara, CA (US)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 306 days.

(21) Appl. No.: 12/248,896

(22) Filed: Oct. 10, 2008

(65) Prior Publication Data

US 2009/0097244 A1 Apr. 16, 2009

(30) Foreign Application Priority Data

Oct. 12, 2007 (CN) .......................... 2007 1 0123920

(51) Int. Cl.
*F21V 14/00* (2006.01)
*F21V 29/00* (2006.01)
(52) U.S. Cl. .................... 362/276; 362/249.02; 362/294

(58) Field of Classification Search .................. 362/276, 362/802, 249.02, 294
See application file for complete search history.

(56) References Cited

U.S. PATENT DOCUMENTS

| | | | |
|---|---|---|---|
| 5,161,874 A * | 11/1992 | Benes | 362/552 |
| 6,791,284 B1 * | 9/2004 | Levy | 315/292 |
| 2003/0179578 A1 * | 9/2003 | Albert et al. | 362/276 |
| 2004/0105264 A1 * | 6/2004 | Spero | 362/276 |
| 2005/0128751 A1 * | 6/2005 | Roberge et al. | 362/276 |

* cited by examiner

*Primary Examiner* — Jong-Suk (James) Lee
*Assistant Examiner* — Peggy A. Neils
(74) *Attorney, Agent, or Firm* — Frank R. Niranjan

(57) ABSTRACT

A method for controlling a remote LED lamp includes: using a memory unit (452) to record a standard value for indicating a normal environmental brightness and a reference value for indicating a normal LED brightness; using a first sensor (41) to detect real-time brightness of the environmental light and transmit a signal (31) indicating the real-time brightness to the memory unit; using the memory unit to compare the signal with the standard value to obtain a result; using a driving unit (451) to control the LED light lamp to be turned on/off according to the result.

10 Claims, 3 Drawing Sheets

LED LAMP WITH REMOTE CONTROL DEVICE

BACKGROUND

1. Field of the Invention

The present invention relates to a light emitting diode (LED) lamp, and more particularly to an LED lamp incorporating a remote control device.

2. Description of Related Art

With the continuing development of scientific technology and the raise of people's consciousness of energy saving, LEDs have been widely used in the field of illumination due to their small size and high efficiency. It is well known that an LED street lamp with LEDs arranged side-by-side in large density generates a lot of heat when the LEDs emit light. Especially, a longtime, continuous use of the LED street lamp may result in the LEDs being overheated by heat accumulated in the LED street lamp, significantly reducing work efficiency and service life thereof. Furthermore, the LED street lamp is not required to be working all day long.

What is needed, therefore, is an LED lamp which can be controlled to work according to actual need.

SUMMARY

A method for controlling a remote LED lamp according to an exemplary embodiment includes: using a memory unit to record a standard value for indicating a normal environmental brightness and a reference value for indicating a normal LED brightness; using a first sensor to detect real-time brightness of the environmental light and transmit a signal indicating the real-time brightness to the memory unit; using the memory unit to compare the signal with the standard value to obtain a result; using a driving unit to control the LED light lamp to be turned on/off according to the result.

Other advantages and novel features of the present invention will become more apparent from the following detailed description when taken in conjunction with the accompanying drawings.

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION

Figure 1:
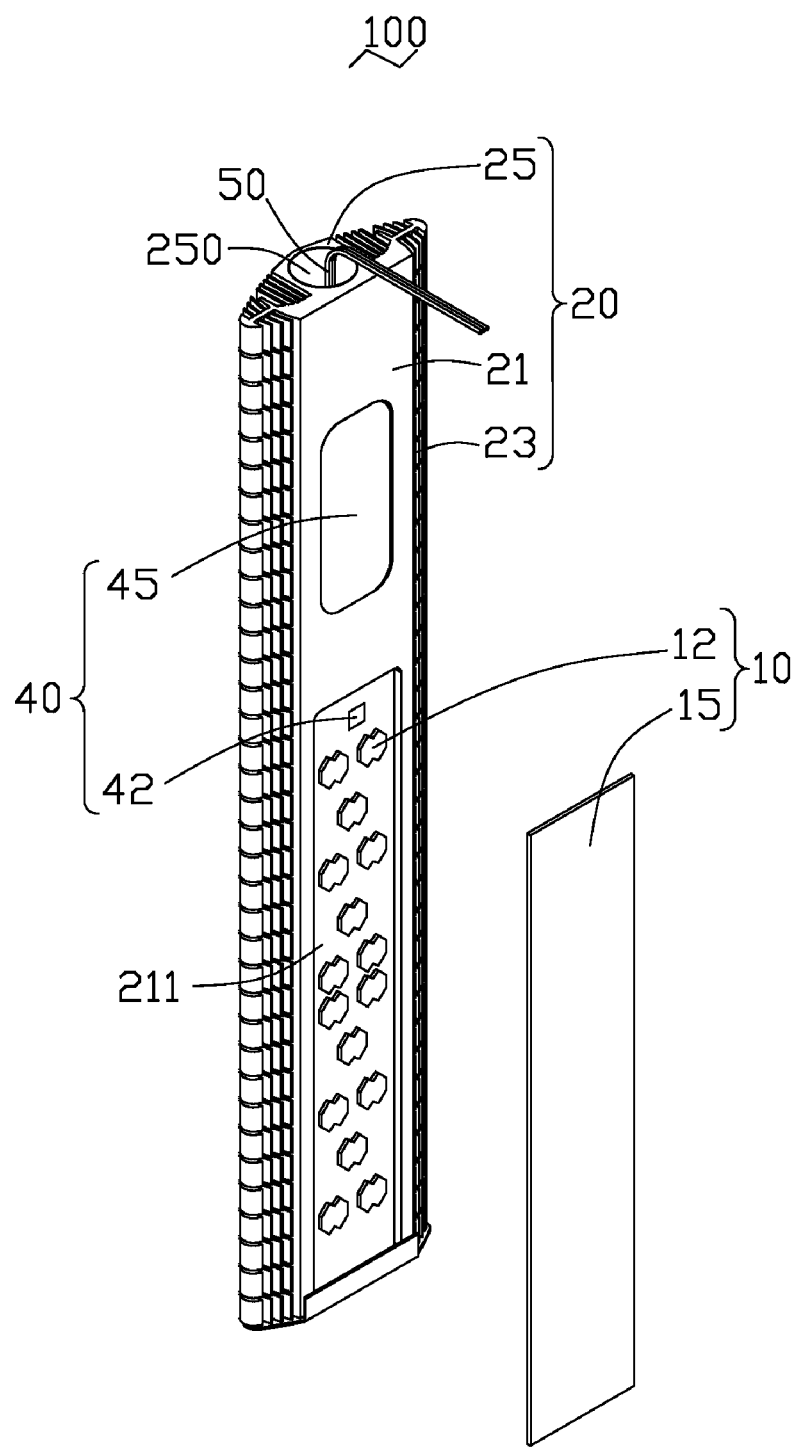
FIG. 1 is an isometric, assembled view of an LED lamp in accordance with a first embodiment, wherein a cover is apart from the LED lamp.
Figure 2:
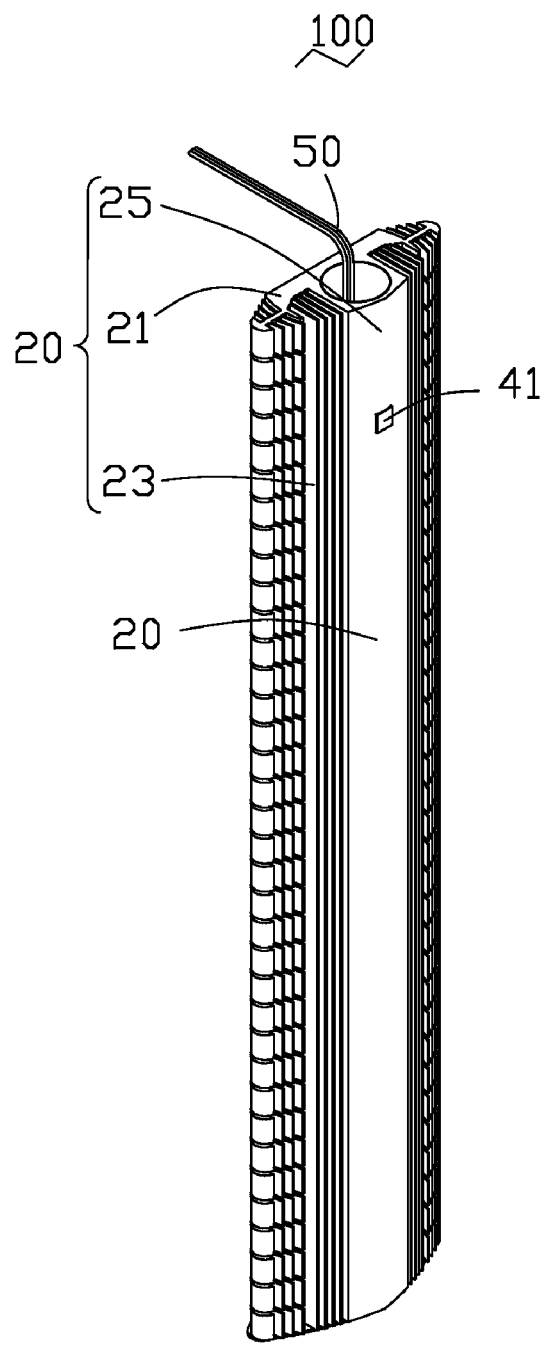
FIG. 2 is similar to FIG. 1, but viewed from a different aspect.

Referring to FIGS. 1-2, an LED lamp 100 in accordance with a first embodiment is shown. The LED lamp 100 is used as a street lamp for a lighting purpose. The LED lamp 100 includes a light source 10, a heat sink 20 and a control unit 40. The light source 10 is located on a front side of the heat sink 10 for emitting light. The control unit 40 is embedded into the heat sink 10 for detecting and controlling the working status of the light source 10.

The heat sink 20 includes a base 21 and a plurality of fins 23. The base 21 has an elongated and rectangular shape. The fins 23 extend outwardly from two lateral sides of the base 21. A rectangular recess 211 is defined in a middle of the front side of the base 21. A protrusion 25 is formed on a middle of the rear side of the base 21 and extends along the elongate direction of the base 21. A circular hole 250 is defined through the protrusion 25 from top to bottom. A cluster of wires 50 is received in the hole 250. The wires 50 are respectively connected with the light source 10 and the control unit 40 for supplying power and transmitting signals.

The light source 10 includes a plurality of LEDs 12 and a rectangular cover 15. The LEDs 12 are received in the recess 211 and arranged side-by-side in large density. The cover 15 is used to cover the LEDs 12 for protecting the LEDs 12 from the external physical shock. The cover 15 is also be used to redirect light from the LEDs 12. The cover 15 is made of transparent or translucent material, such as glass or plastic.

The control unit 40 includes first and second sensors 41, 42 and a control circuit 45. The first and second sensors 41, 42 are used to detect brightness of light. The first sensor 41 is used to detect brightness of the environmental light so that the first sensor 41 is located in a position out of lighting range of the light source 10. Furthermore, for reducing heat of the light source 10 transferred to the first sensor 41, the first sensor 41 is located far away from the light source 10. In the present embodiment, the first sensor 41 is located on the rear side of the heat sink 20.

The second sensor 42 is used to detect the brightness of light emitted by the LEDs 12. The second sensor 42 is located within the lighting range of the light source 10. In the present embodiment, the second sensor 42 is located in the recess 211 of the front side of the heat sink 20 and near the LEDs 12.

The control circuit 45 is located on the front side of the heat sink 20 and above the light source 10 with a distance therefrom.

Figure 3:
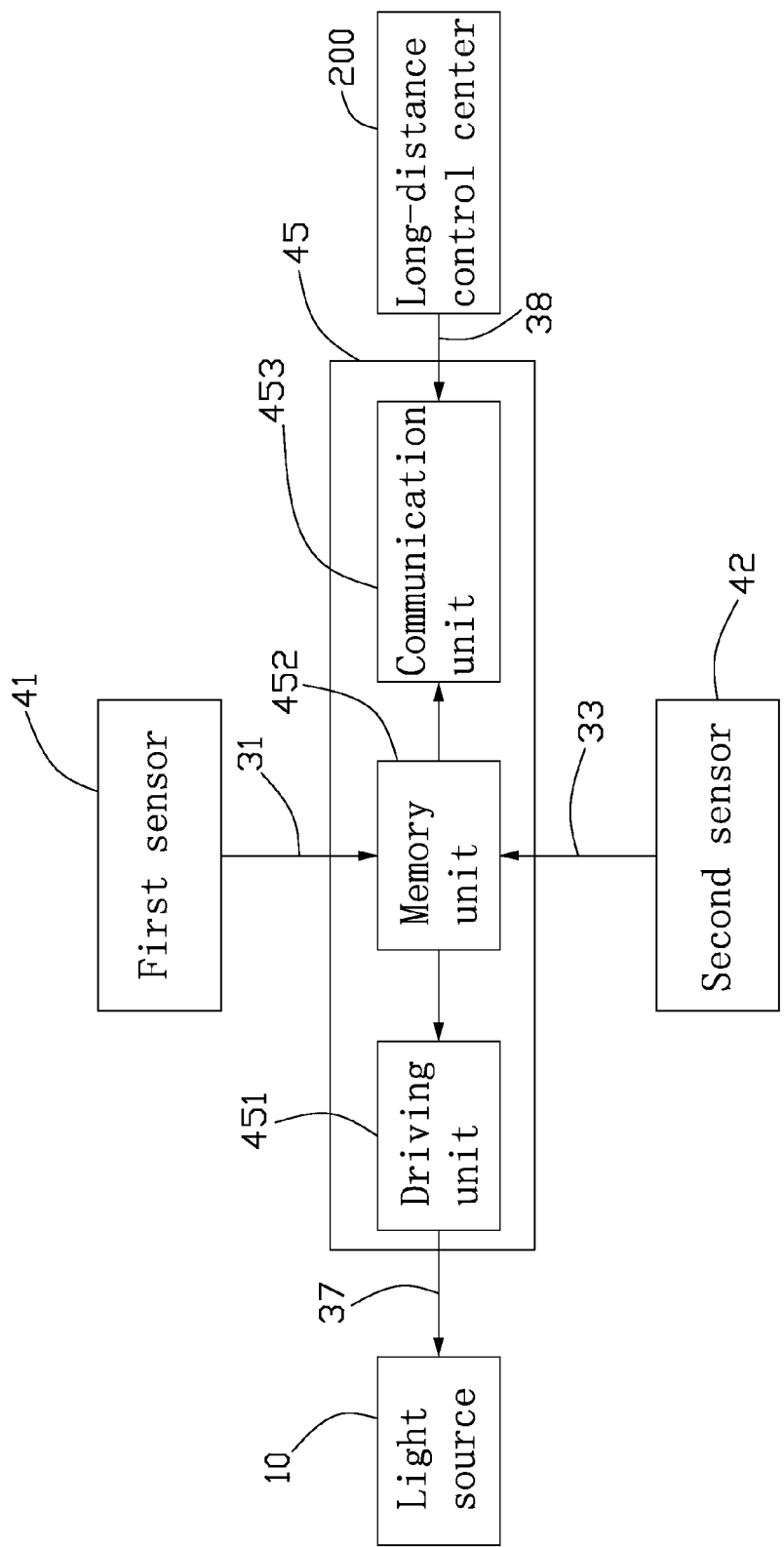
FIG. 3 shows a block diagram of the LED lamp shown in FIG. 1.

Referring to FIG. 3, the control circuit 45 includes a driving unit 451, a memory unit 452 and a communication unit 453. The driving unit 451 is electrically connected with the light source 10 to control the light source 10 to be turned on/off. The memory unit 452 is electrically connected with the first and second sensors 41, 42 for recording standard values of normal environmental brightness of the environment and the LEDs 12 and signals and values generated by the first and second sensors 41, 42, such as values of measured results of brightness of the environment and the LEDs 12, values of lighting time of the light source 12. Signals generated by the memory unit according to the values can be transmitted to a long-distance control center 200 via the communication unit 453 and the wires 50. A password can be set up in the communication unit 453 so that the values in the memory unit 452 can not be obtained unless a verification is passed.

At first, the standard value for indicating a normal environmental brightness is recorded in the memory unit 452. The reference value for indicating a normal brightness of the LEDs 12 is recorded in the memory unit 452. The first and second sensors 41, 42 are then activated. The first sensor 41 is used to detect real-time brightness of the environmental light and transmits a signal 31 indicating the real-time brightness to the memory unit 452. In the memory unit 452, a result is obtained by comparing the signal 31 with the standard value to indicate whether the real-time brightness of the environmental light is bright enough or not. According to the result, the light source 10 will be determined to be turned on or turned off. For example, if value of the real-time brightness of the environmental light is less than the standard value, which means the brightness of the ambient light is not bright enough, the driving unit 451 sends a signal 37 to turn on the light source 10, thereby providing an illumination for the environment. If value of the real-time brightness of the environmental light is more than the standard value, which means the brightness of the ambient light is bright enough, the driving unit 451 sends the signal 37 to turn off the light source 10. Therefore, the light source 10 can be turned on/off according to actual brightness of the environmental light. Thus, electrical energy can be saved and the LEDs 12 can be prevented from working all day long.

When the light source 10 turns on, the second sensor 42 is used to detect real-time brightness of the LEDs 12 of the light source 10 and transfers a signal 33 indicating the real-time brightness of the LEDs 12 to the memory unit 452. In the memory unit 452, a result is obtained by comparing the real-time brightness of the LEDs 12 with the reference value to indicate the working status of the light source 10. Furthermore, brightness, lighting time, flicker, or other abnormal state of the LEDs 12 can be detected by the second sensor 42 and sent to the memory unit 452. If the light source 10 works abnormally, the control circuit 45 sends a signal 38 to the long-distance control center 200 to further indicate working state and position of the LED lamp 100. Thus, the LED lamp 100 can be maintained as well.

Because the second sensor 42 is near the light source 10, the heat generated by the LEDs 12 possibly exert an influence on the second sensor 42, further resulting in measured error of the second sensor 42. For enhancing measured precision of the second sensor 42, the measured result of the second sensor 42 should be corrected. Because the first sensor 41 is far away from the light source 10 relative to the second sensor 42, the first sensor 41 can be used as reference to correct the measured result of the second sensor 42.

For example, the first and second sensors 41, 42 each are initialized to have an identical original fiducial value, and the original fiducial value of the first sensor 41 is recorded in the memory unit 452. At each detection, the second sensor 42 sends the measured result and the real-time fiducial value to the memory unit 452. Then, the memory unit 452 executes an operation to subtract the fiducial value of the first sensor 41 from the real-time fiducial value of the second sensor 42 to obtain a difference value. If the difference value is not zero, the second sensor 42 has a measured error. The measured result of the second sensor 42 then can be corrected by adding the difference value to or subtracting the difference value from the measured value.

In another case, the first and second sensors 41, 42 are initialized to have different original fiducial values. A first difference value between the two original fiducial values is recorded by the memory unit 452 at first. At each detection, the second sensor 42 sends the measured result and the real-time fiducial value to the memory unit 452. The first difference value is added to or subtracted from the real-time fiducial value to obtain a registered value. Then, the memory unit 452 executes an operation to subtract the original fiducial value of the first sensor 41 from the registered value to obtain a second difference value. If the second difference value is not zero, the measured result of the second sensor 42 has an error, which can be corrected by adding the second difference value to or subtracting the second difference value from the measured value of the second sensor 42.

In a word, the light source can be controlled to be turned on/off according to actual need in the environment by the control circuit 45. A lot of electrical energy can be saved and the LEDs 12 can be prevented from being overheated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED lamp comprising:
   a light source comprising a plurality of LEDs; and
   a control unit comprising:
   a first sensor for detecting brightness of an environmental light;
   a second sensor for detecting a working status of the light source; and
   a memory unit electrically connecting with the first and second sensors and generating signals corresponding to the detections of the first and second sensors;
   a driving unit electrically connecting with the light source to control the light source to be turned on/off according to the signal of the memory unit generated corresponding to the detection of the first sensor; and
   a communication unit electrically connecting the memory unit with a long-distance control center to send the signal of the memory unit generated corresponding to the detection of the second sensor for indicating the working status of the light source at the long-distance control center.

2. The LED lamp as claimed in claim 1, wherein the first sensor is located in a position out of lighting range of the light source.

3. The LED lamp as claimed in claim 1, wherein the second sensor is located within the lighting range of the light source.

4. The LED lamp as claimed in claim 1, wherein the second sensor is used to detect brightness, lighting time, and flicker of the light source.

5. The LED lamp as claimed in claim 1, wherein a measured result of the detection of the second sensor is corrected in the memory unit by a reference to the first sensor.

6. The LED lamp as claimed in claim 1, wherein the control unit is connected with the long-distance control center by wires.

7. The LED lamp as claimed in claim 1, further comprising a heat sink, the light source and the control unit are arranged on the heat sink.

8. The LED lamp as claimed in claim 7, wherein the light source is located on a front side of the heat sink, and the first sensor is located on a rear side of the heat sink.

9. A method for controlling a remote LED lamp comprising:
   using a memory unit to record a standard value for indicating a normal environmental brightness and a reference value for indicating a normal LED brightness;
   using a first sensor to detect real-time brightness of the environmental light and transmitting a signal indicating the real-time brightness to the memory unit;
   using a second sensor to detect a working status of the light source;
   using the memory unit to compare the signal with the standard value to obtain a result;
   using a driving unit to control the LED light lamp to be turned on/off according to the result; and using a communicating unit to transmit signals according to the measured result of the second sensor from the memory unit to a long-distance center.

10. The method for controlling a remote LED lamp as claimed in claim 9 further comprising using the first sensor as a reference to correct a measured result of the detection of the second sensor, the correction being performed by the memory unit.

* * * * *